Oct. 7, 1958 R. G. BEAUVAIS ET AL 2,855,165
APPARATUS FOR POSITIONING A VEHICLE
Filed Nov. 1, 1954 7 Sheets-Sheet 6

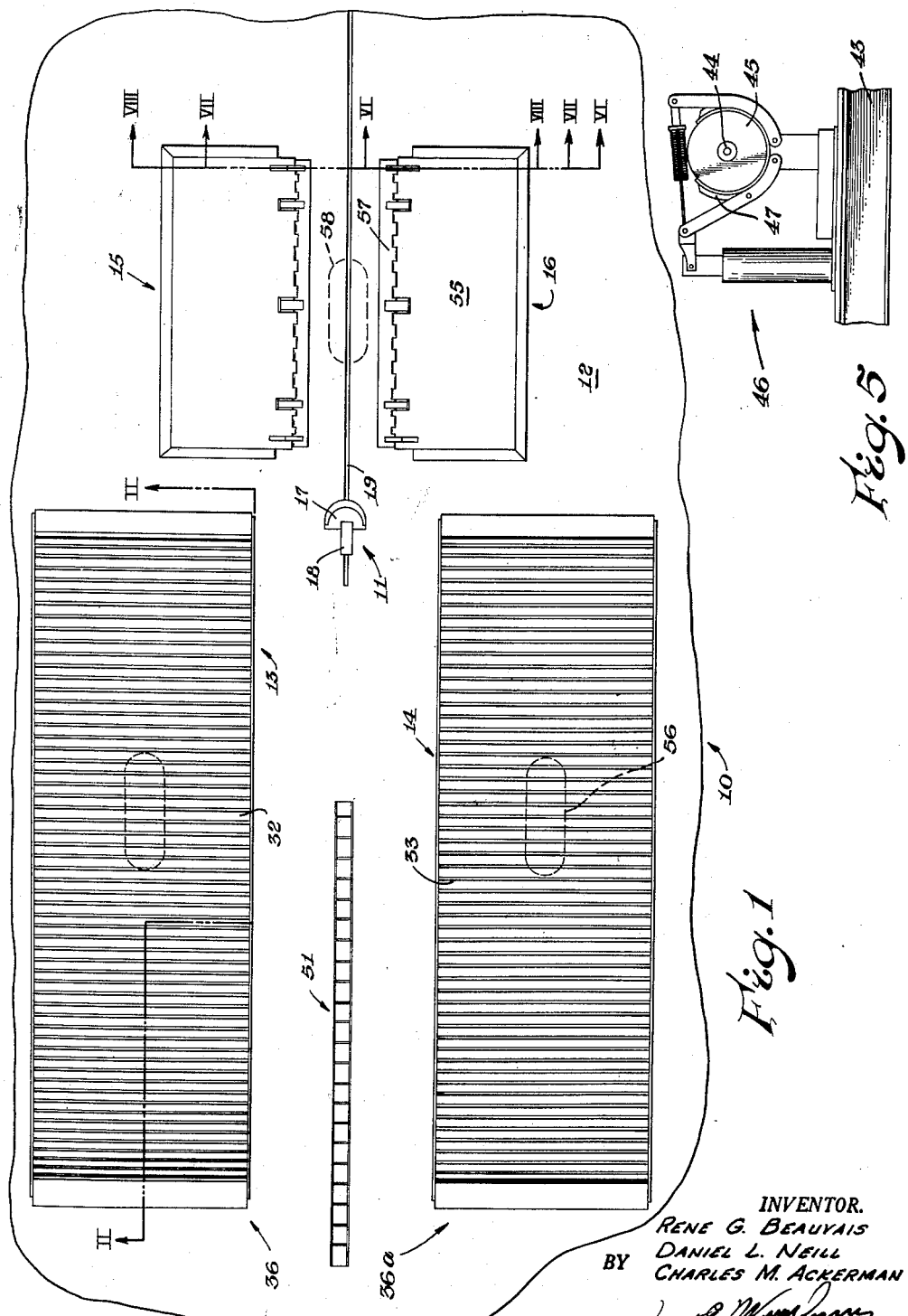

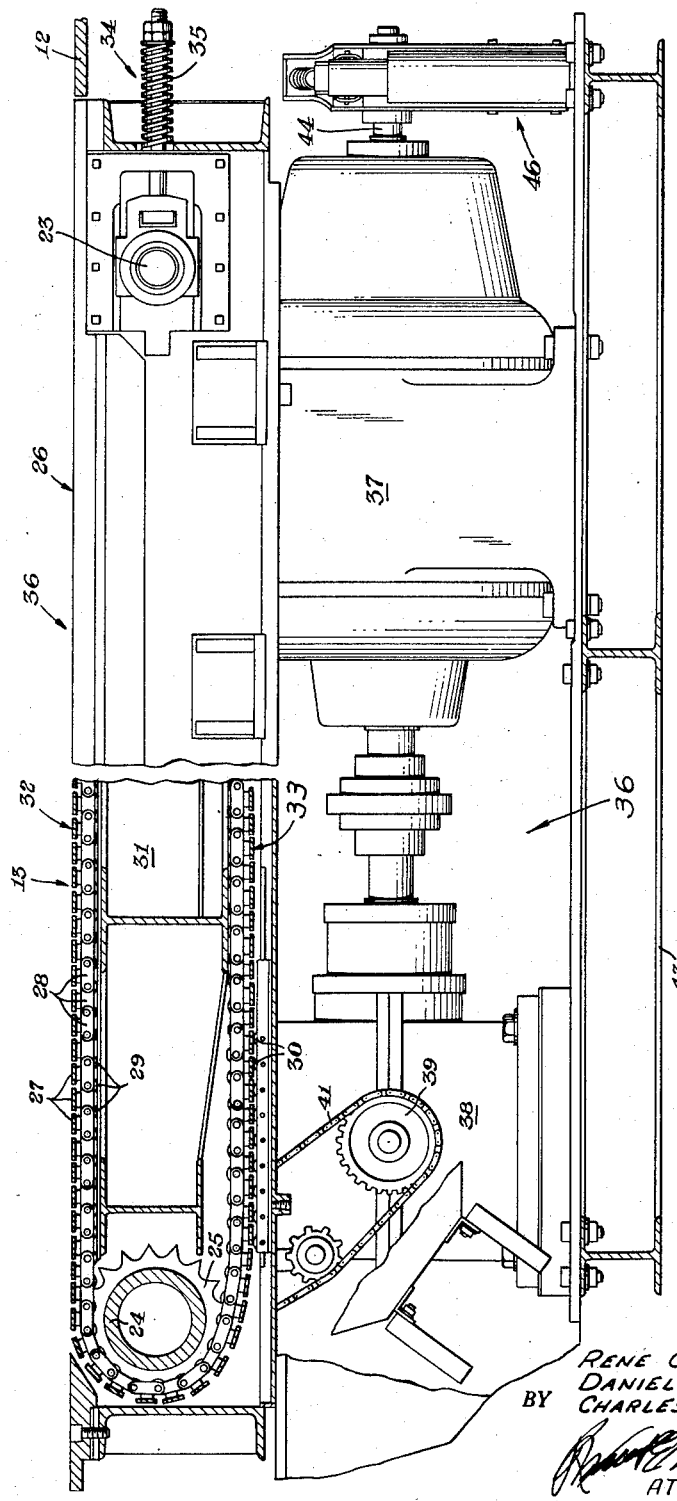

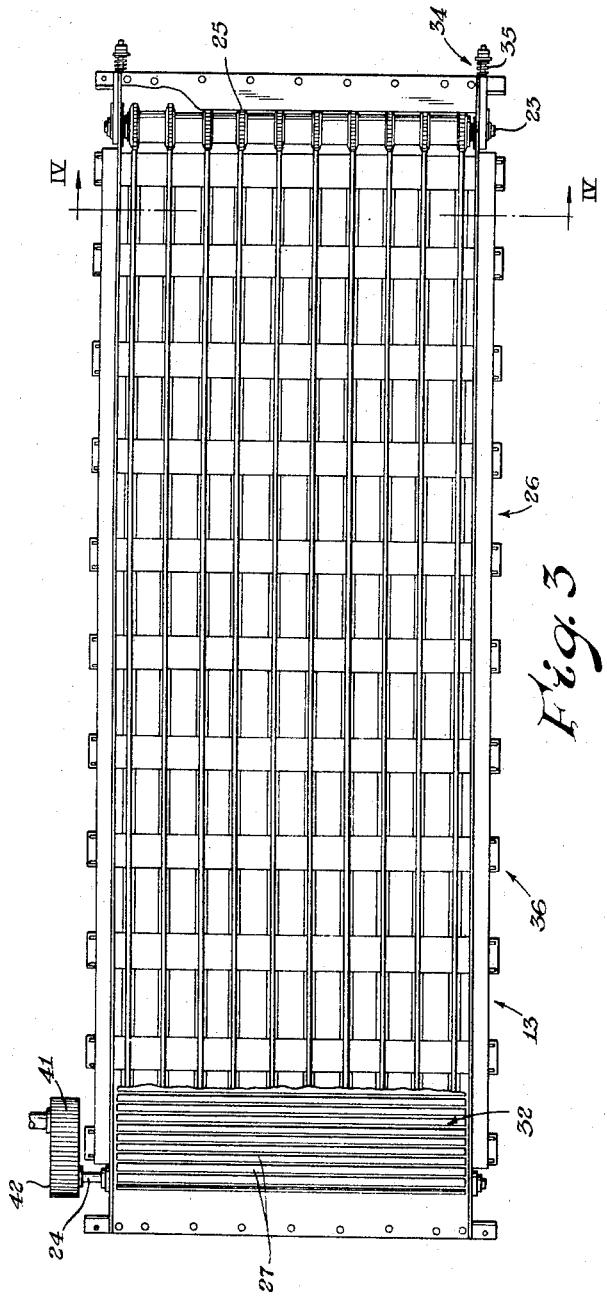
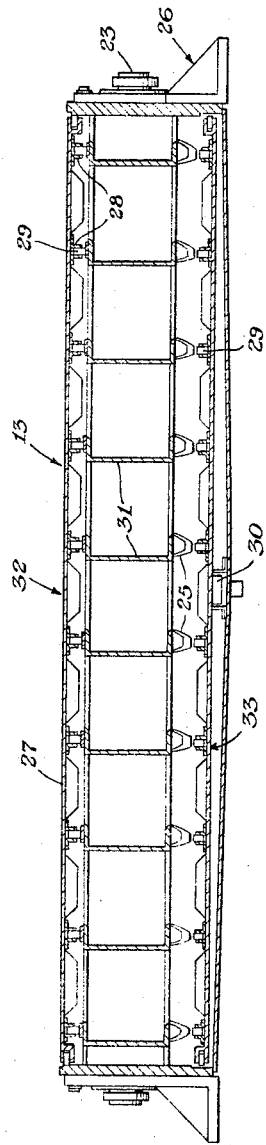

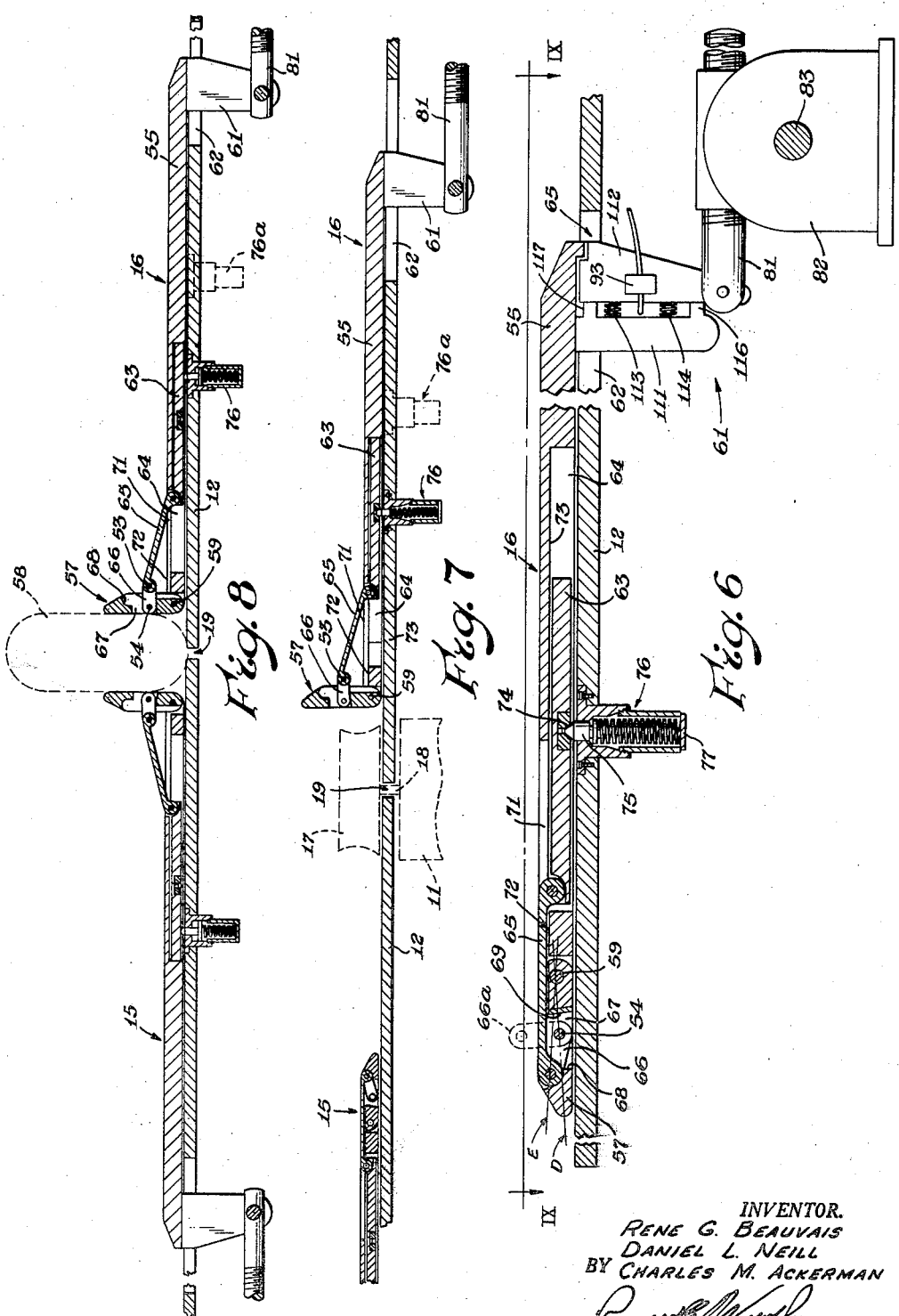

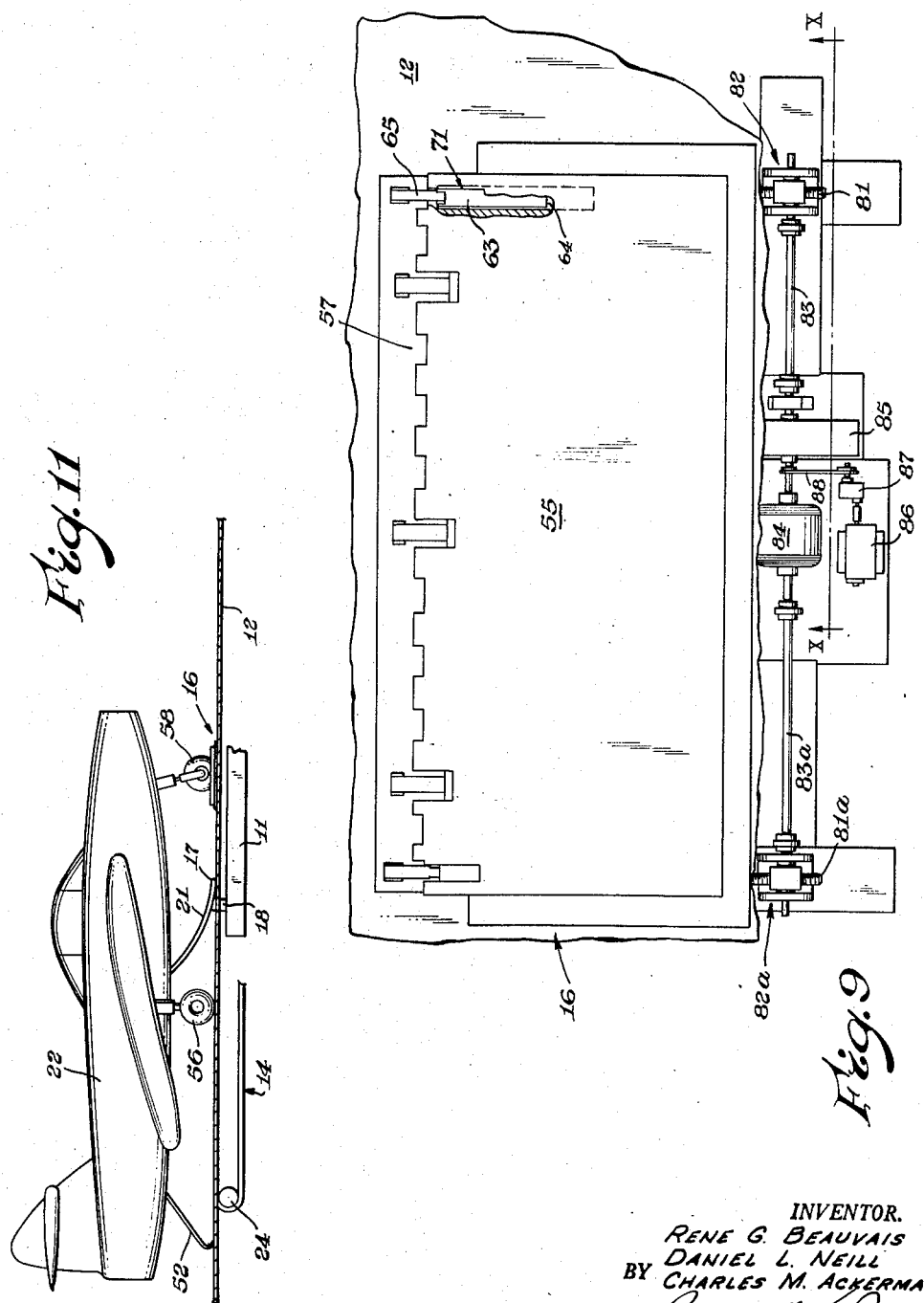

INVENTOR.
RENE G. BEAUVAIS
DANIEL L. NEILL
BY CHARLES M. ACKERMAN

ATTORNEY

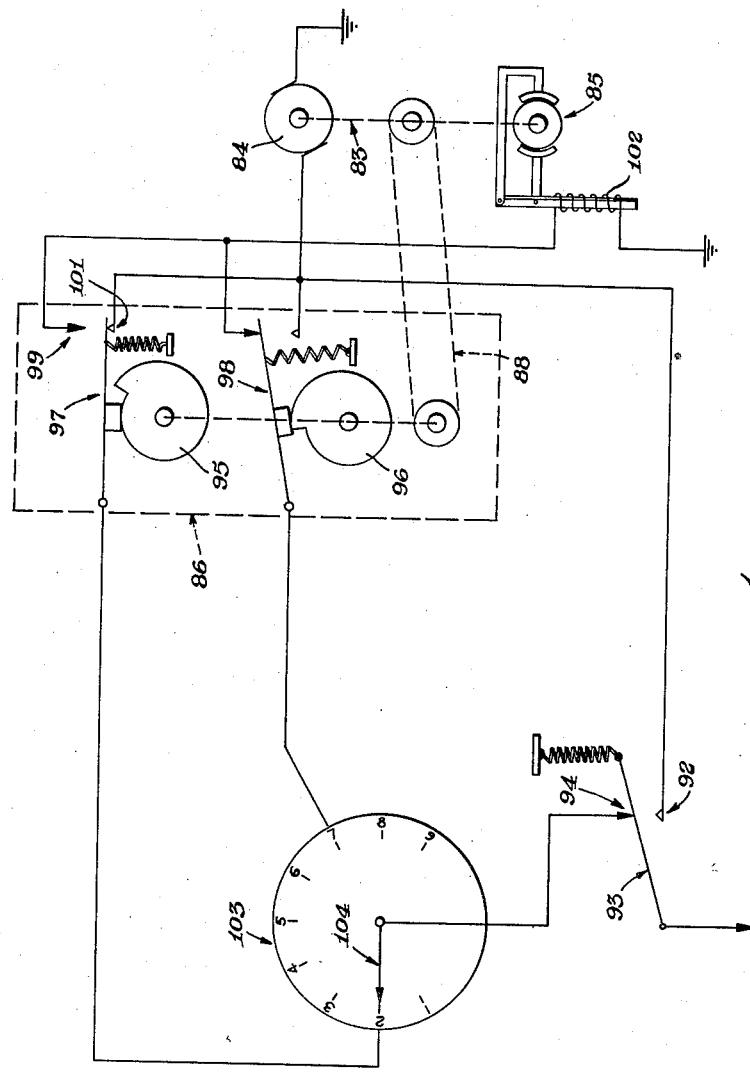

United States Patent Office 2,855,165
Patented Oct. 7, 1958

2,855,165

APPARATUS FOR POSITIONING A VEHICLE

Rene G. Beauvais, Bay City, Daniel L. Neill, Saginaw, and Charles M. Ackerman, Bay City, Mich., assignors to Jackson & Church Company, Saginaw, Mich., a corporation of Michigan Application November 1, 1954, Serial No. 466,078

8 Claims. (Cl. 244—63)

This invention relates in general to a method and apparatus for positioning a vehicle on a substantially horizontal surface with respect to a point in a line on said surface, and more particularly to a method and apparatus whereby an aircraft can be automatically positioned for engagement with, and aligned for forward movement by, an aircraft launching device.

While aircraft of all types have for some time in certain situations been given an assist in take-off from a ship by various types of launching devices, present methods used for this purpose have not been satisfactory.

Particularly, serious difficulties are encountered with jet propelled aircraft which, because of their high wing loading and high speed airfoils, require a higher take-off speed and which, because of jet-thrust characteristics, do not have the rapid initial acceleration provided by propeller driven aircraft. This requirement for high take-off speed has been met with respect to land based jet aircraft by increasing the runway length but since no such easy solution is available for ship, as carrier, based aircraft, various types of launching devices are being given increasing study.

The jet planes now in carrier service have for some time been given an assist in take-off by various types of launching devices mounted in the carrier flight deck. These planes are light weight and can be positioned manually. Improvements in the art of jet aircraft design, development, and manufacture has made available for carrier use, larger multi-engine planes of considerably greater load capacity and gross weight. Two things are necessary to permit use of the latest design planes.

(1) Launching devices capable of launching successfully the heavier jet planes at their corresponding higher take-off speeds.

(2) Some form of automatic mechanical device for placing the heavier aircraft correctly over the center line of the launching device to position the plane for warm-up and release. Such apparatus must be able to repeat this operation of positioning succeeding planes for launching within a time cycle which permits flight operation of air groups.

In effecting such take-off, the time cycle involved is of critical importance. It is recognized that even a ten second increase in the take-off interval of each aircraft in a flight of 30 aircraft will result in an increase of 5 minutes in the time that the first aircraft to take off must circle above the carrier before the full flight is airborne. It is also recognized that the fuel consumption of jet-type aircraft, particularly at low altitudes, is very high and, therefore, flight at low altitude must be kept to an absolute minimum. Even where it is possible for the aircraft to climb to altitudes where the fuel consumption is more efficient and then rendezvous the flight at such altitude, the 5 minutes which the first aircraft loses due to the increased take-off time may change the effective range by as much as 50 miles and this may be the difference between successfully reaching or not reaching a desired target and returning to the ship.

One of the gravest problems encountered in launching aircraft from a carrier deck, where some type of launching device is utilized to augment the thrust of the engine, is the alignment of the longitudinal center line of the aircraft parallel with the direction of the launching force. This is true whether a tricycle, conventional, or other landing gear is used. The initial acceleration produced by the launching mechanism is so rapid, as a rule, that misalignment of the aircraft with the line of its launching force will produce hazardous consequences.

At the present time, it is necessary for aircraft, jet or other, to be manually positioned and aligned by a crew of from four to fifteen men who physically and manually position the aircraft with respect to the line of flight produced by the launching device. Due to the cumbersomeness of this method and the fact that the men will fatigue quickly where there is a large number of aircraft being launched, there is a considerable amount of time lost by said present methods. With steadily increasing size and weight of aircraft, this problem is rapidly becoming more acute. It has been found that, even with the most efficient methods of manual aligning, the launching interval of each launching device for each aircraft from a carrier deck is at least 45 seconds. After several of the aircraft have been launched, the efficiency of the crew will drop materially and the launching interval may often exceed a full minute.

By using a fully automatic, preferably with optional manual controls, mechanical positioning and aligning apparatus, which is the substance of this invention, it is possible and practical to reduce the launching cycle or take-off interval of each one of a flight of aircraft to 30 seconds per aircraft per launching device. This rate is not affected by human fatigue since it involves only a little physical labor.

Another factor which decreases the effectiveness of manually positioning and aligning aircraft with respect to the launching device is the engine blast emanating from the jet tail pipes, particularly when an afterburner is used, which makes movement around the aircraft dangerous and prevents successive aircraft from following too closely after each other into take-off position. With a fully automatic positioning apparatus the danger aspect to positioning personnel from either the prop blast or the tail blast is completely eliminated.

A still further problem involves the roll and pitch of an aircraft carrier. A reduction in the number of men required to be present on a carrier's deck, particularly when it is wet and slippery, will further reduce the likelihood of injury to personnel.

Accordingly, a primary object of the invention is to provide a method, and apparatus for practicing said method, for positioning a wheeled vehicle on a substantially horizontal surface in a predetermined manner with respect to a line located along said surface and with respect to a point in said line.

A further object of the invention has been to provide a method, and apparatus for carrying out said method, capable of positioning a wheel supported aircraft in a predetermined position with respect to a launching device.

A further object of our invention has been the provision of a method and apparatus therefor operable with existing types of mechanisms for launching jet and/or propeller driven aircraft from the flight deck of an aircraft carrier, which method and apparatus will automatically and positively position and align the aircraft with respect to the launching mechanism in much less time than is possible by the most effective methods presently available, and whereby the total time for an individual launching, or the launching cycle, is greatly reduced from the time previously required.

A further object of the invention is to provide a device, as aforesaid, which will be capable of successfully launching aircraft from the flight deck of an aircraft carrier in spite of all ordinary roll and pitch thereof, and particularly which will operate successfully with 15° side roll and 5° pitch.

A further object of this invention is the provision of a method and apparatus, as aforesaid, which is applicable to aircraft having either tricycle or conventional type landing gear and which can be used with existing types of launching mechanisms without making any material alteration in said launching mechanisms and with a minimum of changes of the flight deck surrounding same.

A further object of this invention is the provision of a method and apparatus, as aforesaid, which is easily and quickly adaptable to any type of carrier based aircraft which can be launched from a carrier deck by mechanisms presently in use or known to exist.

Other purposes and objects of this invention will become apparent to persons familiar with this type of equipment upon reading the following specification and examining the accompanying drawings in which:

Figure 1 is a top plan view of a portion of the flight deck of an aircraft carrier having an aircraft launching mechanism and showing our invention associated therewith.

Figure 2 is a sectional view substantially as taken along the line II—II of Figure 1.

Figure 3 is a broken top plan view of a translating belt comprising a part of our invention.

Figure 4 is a sectional view taken along the line IV—IV of Figure 3.

Figure 5 is an end view of a brake, the side view of which is shown at the rightward end of Figure 2.

Figure 6 is a sectional view taken along the line VI—VI of Figure 1.

Figure 7 is a sectional view substantially as taken along the line VII—VII of Figure 1 with the right chock extended in detent position.

Figure 8 is a sectional view substantially as taken along the line VIII—VIII of Figure 1 with both chocks extended in final position.

Figure 9 is a fragmentary, broken plan view of that portion of Figure 1 indicated by the line IX—IX in Figure 6 and shows the right chock retracted.

Figure 11 is a side elevation view of a jet-type aircraft in aligned position ready for launching from a carrier deck.

Figure 14 is a diagram of the selector circuit.

Figure 12:
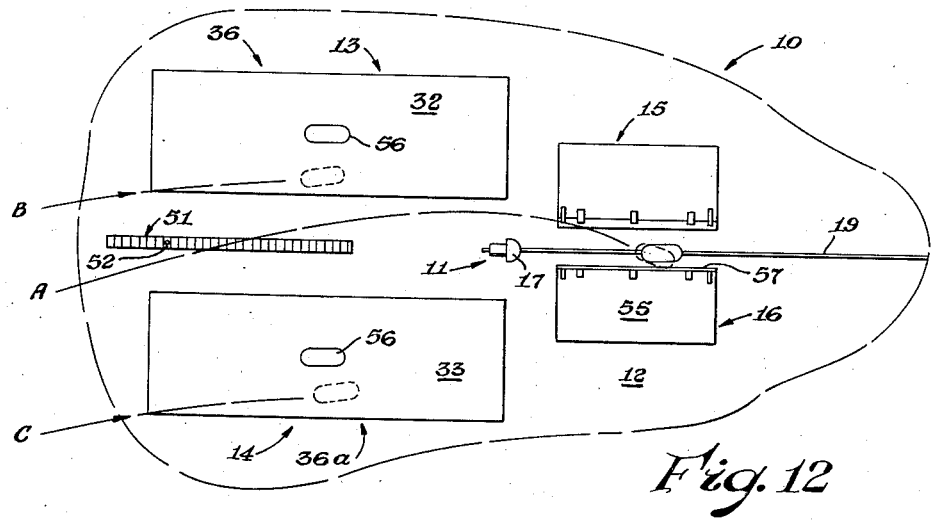
Figure 12 is a schematic, top plan view of the invention as used by an aircraft having a tricycle type landing gear.

In order to meet the objects and purposes set forth above, as well as others related thereto, we have provided, as shown in Figures 1, 11, 12 and 13, an aircraft positioning and aligning apparatus 10 cooperable with the launching mechanism 11 installable in any convenient launching surface, as an aircraft carrier deck or a fixed runway. Since the specific apparatus here utilized for illustrative purposes has been designed for aircraft carrier use, the invention will be described in connection therewith.

The alignment apparatus is comprised in general of an actuating device including a pair of endless translating belts 13 and 14, disposed on opposite sides of, and preferably equidistant from, the longitudinal center line of the launching mechanism near and aft of the battery end thereof. Said belts have upper courses or flights which lie substantially in the plane of the flight deck 12 and are simultaneously movable in either direction parallel with the center line of said launching mechanism. A pair of movable nose wheel chocks 15 and 16 are disposed upon opposite sides of said center line for movement toward and away therefrom to guide and align the nose wheel of an aircraft having tricycle landing gear. Said chocks are disposed upon, and parallel with, said flight deck just forward of said translating belts in the launching direction. Appropriate drive means and electrical control means are provided for operating the belts 13 and 14 and chocks 15 and 16 in a predeterminable sequence, as hereinafter described in detail.

For the purposes of convenience in description, the terms "upper," "lower" and derivatives thereof will be used herein with reference to the positioning apparatus as appearing in Figures 2 and 4. The terms "front" and "rear" will refer to the rightward and leftward ends of the apparatus, and parts associated therewith, respectively, as appearing in Figures 1 and 2. The terms "left," "right" and derivatives thereof will have reference to the alignment apparatus, and parts associated therewith, as appearing in Figures 4, 6, 7 and 8. The terms "inner," "outer" and derivatives thereof will have reference to the geometric center of the alignment apparatus and parts associated therewith.

*Detailed construction*

As disclosed in Figures 1, 11 and 12, the positioning and alignment apparatus 10 is designed for operation and cooperation with a conventional launching mechanism 11 located in the flight deck 12 of a conventional aircraft carrier or the like, not shown. A shuttle hook or cable spreader 17, which is disposed upon the upper surface of the flight deck 12, is connected to said launching mechanism 11 by an arm 18 which extends through an elongated slot 19 in, and lengthwise of, the flight deck 12. The shuttle hook 17, which is engageable by a cable or bridle 21 (Figure 11) secured to the aircraft 22, is movable by said launching mechanism 11 from the battery position shown in Figure 1 along said slot.

Figure 13:
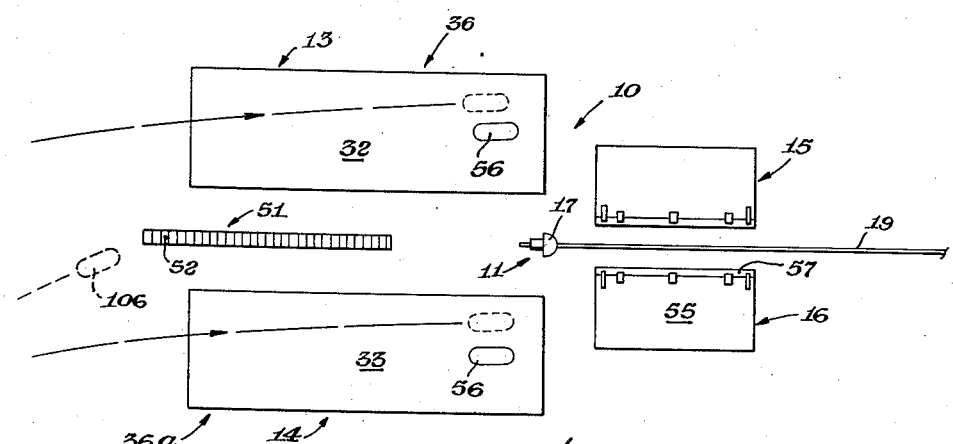
Figure 13 is similar to Figure 12, but shows the invention in use with an aircraft having a conventional type landing gear.

The slot 19 in the flight deck 12 is, in this embodiment, disposed along the longitudinal center line of the launching mechanism 11 and the parts of the alignment apparatus 10 associated therewith. However, said slot does not necessarily extend rearwardly between all parts of said alignment apparatus, as shown in Figure 1. A pair of translating belts 13 and 14, which are advantageously substantially identical, excepting that one is a mirror image of the other, as are the mechanisms actuating said belts, are disposed on opposite sides of, and have upper courses 32 and 33 which are preferably parallel with, the slot 19 (Figures 1, 12 and 13). The left belt 13, only, will be described in detail and such description will be understood to refer in mirror image also to the right belt 14.

As shown in Figures 1, 2, 3 and 4, the belt 13 is rotatably supported upon the front and rear sprocket shafts 23 and 24, respectively, by means of a plurality of spaced sprockets 25 mounted upon and rotatable with said shafts 23 and 24. Said shafts are rotatably supported in suitable framework 26 mounted beneath and adjacent to the flight deck 12.

The belt 13 is comprised of a plurality of parallel, transverse slats 27 having a plurality of links 28 (Figures 2 and 4) of which one link is secured to each respective end of each slat, and which links are spaced along the length of said belt in increments equal to and corresponding with the pitch of the sprockets 25 on the shafts 23 and 24. Said links serve the dual purpose of providing flexible, chain belts engageable by said sprockets, and pivotally interconnecting the adjacent parallel slats 27. Said links are provided with rollers 29 where they pivotally engage each other and the center lines of said rollers are parallel with said slats. The rollers are engageable with the upper surfaces of horizontal, parallel beams 31 and are disposed between the upper and lower courses 32 and 33 of said belt 13. Means such as rollers 30 (Figures 2 and 4) are provided to support the lower course 33 of said belt 13 as it moves beneath said beams 31 (Figures 2 and 4). An adjustable, automatic tensioning device 34, including the coiled springs 35 (Figures 2 and 3), is provided at the one end of the belt 13 for engagement with the shaft 23 to impose a preselectable tension upon the belt 13 and to take up belt wear in a substantially conventional manner. As shown in Figure 2, the beams 31 cooperate with the link rollers 29 to keep the upper surface of the upper course 32 substantially in the plane of and flush with the upper surface of the flight deck 12 to support the weight of belt and aircraft.

It will be recognized that conveyors having a variety of structures may be used to accomplish substantially the same purposes without departing from the scope of the invention and, therefore, the specific structure herein disclosed is for illustrative purposes only. The belts 13 and 14 are of such width and have upper courses of sufficient length to be adaptable for use with all types of landing gear, both tricycle and conventional, presently in existence for use by carrier based aircraft. Thus, the spacing between the two belts, their overall width, their individual widths and lengths and other similar details of structure can be varied within the scope of this invention. It is essential that a force be applied to the main gear of the aircraft by the belts 13 and 14 in a direction parallel with the slot 19. This is accomplished by the disclosed arrangement of the belts and related parts. However, it can reasonably be accomplished by other, similar arrangements of said belts as, for example, where the upper courses of the belts are disposed at equal, rearwardly, or equal forwardly, diverging angles with respect to the slot 19.

The means mechanically driving the belt 13 (Figures 2, 3 and 5) is comprised of an electric motor 37, or similar prime mover, coupled to a gear box 38. The motor 37 and gear box 38 are supported upon frame elements 43 adjacent to the conveyor 13. A drive sprocket 39 driven from the gear box 38 is linked by means of a chain belt 41 to a driven sprocket 42 (Figure 3) on the rear shaft 24 of the belt 13. The motor 37, gear box 38, belt 13, brake 46 and inter-related parts combine to provide one actuating device 36. The belt 14 and its corresponding parts provide another actuating device 36a. In this embodiment, the two devices 36 and 36a are operated in unison. Electrical means, discussed hereinafter in more detail, is provided for controlling the energization of the actuating devices 36 and 36a, hence the operation of the belts 13 and 14. The motor 37, which in this embodiment is reversible, is provided with a double shaft extension, the front shaft 44 thereof having a brake drum 45 of a conventional type supported upon and secured thereto. A motor braking device 46, including a pair of brake shoes 47 engagable with said brake drum 45, is provided for quickly stopping the rotation of the armature in the motor 37, and through it the whole drive system, as desired and required.

An elongated, conventional hold-back cleat 51 is provided in the flight deck 12 along the center line of said slot 19 and rearwardly thereof as shown in Figures 1, 12 and 13. Said cleat 51, which is disposed midway between and parallel with the belts 13 and 14, is engageable by a hold-back cable and/or hook 52 secured to the aircraft 22 (Figure 11) in a substantially conventional manner.

As shown in Figures 1, 12 and 13, particularly, the alignment apparatus 10 also includes a pair of nose wheel chocks 15 and 16 disposed upon opposite sides of the slot 19 for movement toward and away therefrom in a direction perpendicular to slot 19. The said chocks 15 and 16 are slidably supported upon the flight deck 12 for said transverse movement in a location forwardly of the belts 13 and 14 and are preferably, but not necessarily, substantially mirror images of each other in structure as is also the means for driving and operating them. Therefore, detailed description will be given hereinafter of the right chock 16 and the operating mechanism therefor and such will be understood to refer in substance also to the left chock 15.

Said chock 16 (Figures 1 and 9) has a bed plate 55 which is beveled on its front, rear and outer edges to reduce obstruction thereof to the passage of aircraft wheels or main landing gear 56 thereover. A pivot plate 57 is hinged by means of the hinge rod 59 (Figures 6 and 7) upon the leftward or inner edge of said bed plate 55 for engagement by, and alignment of, the nose wheel 58 (Figure 11) of a tricycle type landing gear. Said pivot plate 57 is movable (Figures 6, 7 and 8) from a retracted position parallel with the flight deck 12 and substantially co-planar with the bed plate 55 to an extended position substantially perpendicular to both.

An elongated detent bar 63 is slidably disposed within a detent groove 64 in the lower surface of the bed plate 55, said groove being transvers of the launching slot 19 and stopping short of the leftward and rightward edges of said bed plate 55. The groove 64 is somewhat longer than the detent bar 63 disposed therein to the extent, and for the purposes, hereinafter described in detail. The leftward end of the detent bar 63 (Figures 6 and 7) is pivotally secured to the rightward end of a link bar 65 whose leftward end is pivotally secured by the rod 53 between the rightward ends of a pair of pivot bars 66 which are in turn pivotally mounted upon the rod 53 within a slot 67 in the pivot plate 57 (Figures 6, 7, 8 and 9). The pivot bars 66 are pivotally movable within the slot 67 from a position substantially parallel with the pivot plate 57 (Figure 6) to a position substantially perpendicular to said pivot plate 57 (Figure 7) at which time the ends of said bars 66 secured to the link bar 65 extend from the slot 67. The inner and outer end walls 68 and 69 (Figure 6) of the slot 67 provide the means for limiting the above mentioned movement of said pivot bars 66. As shown in Figure 6, the center line "D" between the hinge rod 59 and pivot rod 54 is below the center line "E" between hinge rod 59 and pivot rod 53. Thus, as the bed plate 55 moves leftwardly with respect to detent bar 63, the pivot bars 66 are first moved from their solid line to the broken line position 66a in Figure 6 while the pivot plate continues to remain in its Figure 6 position.

The bed plate 55 is provided with a link bar slot 71 (Figures 8 and 9) which is parallel with, and communicates with, the detent groove 64 adjacent to its leftward end. A bar groove 72 in the upper surface of plate 55 extends from the leftward end of said groove 64 and slot 71 to the leftward edge of the bed plate 55. Thus, the bar slot 71 and the bar groove 72 permit the link bar 65 to move from a position wherein its upper surface is flush with the upper surface of the bed plate 55 (Figure 6) to a position wherein bar 65 is raised out of the groove 72 and extends at an angle through the slot 71 (Figures 7 and 8). The bar slot 71 is preferably narrower than the detent groove 64 thereby providing an undercut lip 73 in the bar slot 71 for holding the detent bar 63 against upward movement when at the leftward end of the groove 64.

The detent bar 63 is provided with a detent recess 74 (Figure 6) intermediate its ends and in the lower surface thereof. A detent pin 75 is hold in the flight deck 12 by means such as the fixture 76 having a spring 77 urging the detent pin 75 upwardly against the lower surface of said detent bar 63. In one position of the detent bar 63, the detent pin 75 is receivable into the detent recess 74 for resisting movement of the detent bar 63. However, the detent groove 64 being longer than the detent bar 63, the bed plate 55 can be moved without moving the detent bar. The amount by which the detent groove 64 exceeds the length of the detent bar 63 is preferably such that the rightward end of said bar 63 will abut the rightward end of the groove 64 (Figure 7) when the pivot plate 57 is in its upright, or extended, postion, and the leftward end of the bar 63 will be close to the leftward end of the groove 64 when the pivot plate 57 is in its retracted or lowered position, as shown in Figure 6.

Figure 10:
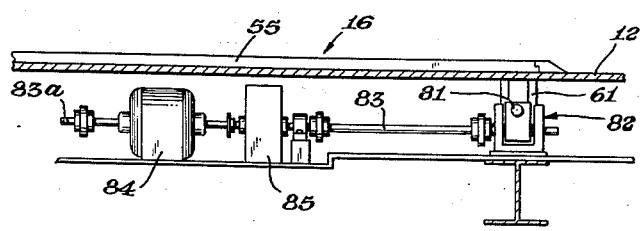
Figure 10 is a sectional view taken along the line X—X of Figure 9.

A pair of yoke members 61 (Figures 6 and 10) are secured to, and extend downwardly from, the rightward edge of the bed plate 55 adjacent to the front and rear ends thereof. Said yokes 61 are received through a pair of spaced slots 62 in the flight deck 12 disposed perpendicularly to the slot 19. The length of said slots 62 is governed by the necessary movement of the bed plate 55 between the outer retracted position and the inner extended position represented by Figures 6 and 8, respectively. The difference between these two positions, hence the length of the yoke slots 62, will be governed by such factors as, for example, the thickness of the nose gear, either as a single or double wheeled gear, and the space required for the shuttle hook 17 to pass unobstructedly between the left and right chocks 15 and 16, respectively. It will be recognized that these distances and dimensions may be varied materially without departing from the scope of the invention.

Each of the yokes 61 (Figures 6, 9 and 10), of which there are two for each chock, is pivotally secured beneath the flight deck 12 to the inner end of one drive rod 81. The rightward end of the rod 81 is connected to, and axially movable by, the gear box 82 which is actuated in any convenient, conventional manner by the drive shaft 83. Thus, rotation of the drive shaft 83 will be converted by the gear box 82 into axial movement of the drive rod 81. The drive shaft 83a effects the same results through the gear box 82a upon the other drive rod 81a (Figure 9). The drive shafts 83 and 83a are preferably, but not necessarily, coaxial and extend in opposite directions from a prime mover, such as the motor 84 (Figure 9). A solenoid operated brake 85 (Figures 9, 10 and 14), which may be of any convenient, conventional type is associated with the drive shaft 84 for arresting motion of the armature of the motor 84 and through it the whole chock drive system. A multi-cam rotary control switch 86 (Figures 9 and 14) is connected to, and rotatable with, the drive shafts 83 and 83a by means of the chain drive 88 and gear reducer 87. Thus, the switch 86, or like means, and suitable circuitry may be connected to control the energization of the motor 84 in a substantially conventional manner, and thereby utilized to control the movement of the chock 16 between predeterminable and preselected positions. It will be understood that mechanism, similar to that previously described in connection with the movement of chock 16, is also provided to control the movement of chock 15 between its predeterminable and preselected positions.

An electrical circuit of one suitable type which may be used to effect such control is illustrated in Figure 14. A source of energy is directly connectible to the motor 84 through one terminal 92 of a manually actuable, spring loaded, switch 93 for rotating the shaft 83. A corresponding switch for controlling the circuitry associated with the left chock may be manually operated or it may respond to contact of the nose wheel of the aircraft with one of the chocks as hereinafter described further. The armature of the switch 93 is normally disengaged from the terminal 92 and normally engaged with terminal 94. The rotary switch 86 may be of the type having one or more cams 95 and 96 operating cam switches 97 and 98, respectively. The cam switches 97 and 98 are preferably of the type wherein the cam urges the armature against one contact 99 and resilient means urges the armature against another contact 101. The contact 101 is connected to the motor 84 and the contact 99 is connected to the solenoid 102 of the brake 85. A multi-terminal selector switch 103 has an armature 104 connected to terminal 94 and selected ones of the terminals of switch 103, as terminals "2" and "7," are connected to the armature of the cam switches as switches 97 and 98, of rotary switch 86. Thus, each terminal on the selector switch 103 may be connected to a separate circuit, including one of the cam switches in the rotary switch 86, for each type aircraft having a different landing gear, wheel size, weight or other operational characteristic.

By closing the armature of switch 93 on the terminal 92 the motor 84 is energized, thereby rotating the drive shaft 83 and the switch 86 through the chain drive 88 and reducer 87. This immediately moves the cam of the selected cam switch, as switch 97, and thereby connects the contact 101 to the armature 104 of the selector switch 103. Thus, when switch 93 is released, the motor 84 continues to be energized from source through terminal 94 of switch 93 until cam 95 again disconnects the armature of switch 94 from contact 101.

One convenient way of causing the switch 93 to respond to pressure exerted by the nose wheel of the aircraft on a chock is indicated as mechanism 61 in Figure 6. Here the yoke member is divided into parts 111 and 112 connected by heavy springs 113 and 114. The switch 93 is supported on one of said parts 111 and 112 with its actuator contacting, or close to, the other thereof. Stops 116 and 117 limit the distance the parts 111 and 112 can move toward each other and provide a positive engagement therebetween after actuation of the switch 93.

Operation

The operation of the alignment apparatus 10 will be varied in some respects depending upon whether an aircraft having tricycle landing gear or conventional landing gear is being aligned by said apparatus. Since most aircraft, particularly of the jet-type, are now provided with tricycle landing gear and the positioning of aircraft having tricycle gear is the more difficult procedure, the operation of the aligning apparatus will first be described with respect to a tricycle landing gear. Then, the operational description will be amplified, as necessary, to apply to a conventional type landing gear.

The cycle of operation of our aligning apparatus 10, where used in a normal manner incident to the launching of an aircraft, will begin as soon as the area in the immediate vicinity of the battery end (Figure 1) of the launching apparatus has been cleared of other aircraft. The armature 104 of the selector switch 103 is first placed on the terminal, as "2," corresponding to the type and model of aircraft being taxied into such position and the shuttle 17 is disposed in "battery position," as appearing in Figure 1. The pilot of the aircraft then taxies his aircraft along the flight deck approaching the apparatus 10 from aft thereof with his nose wheel and main gear following paths substantially as indicated by the broken lines "A," "B" and "C" in Figure 12. The shuttle 17 is avoided by the path "A" of the nose wheel 58 as said nose wheel moves into position between the chocks 15 and 16.

The movement of the rightward chock 16 is normally initiated by the manual switch 93 (Figure 14) as soon as the aircraft starts to taxi into said position. In many instances, the width of the nose wheel is substantially less than the width of the shuttle 17. Thus, it is necessary to "pre-position" the right chock (Figure 7) at a distance outwardly of its final position (Figure 8) to permit the retraction of the shuttle without obstruction by the right chock.

The switch 93 is actuated to close the circuit through the terminal 92 thereby energizing the motor 84 (Figure 9) and causing the bed plate 55 of the right chock 16 to be moved inwardly from the position shown in Figure 6 immediately following the launching of the next preceding aircraft. As the bed plate 55 is moved inwardly, or leftwardly, the detent bar 63 is held fixed with respect to the flight deck 12 by engagement of the detent pin 75 within the detent recess 74 of said bar 63. This causes the pivot bars 66 to be pivoted from their solid line position into their broken line position 66a (Figure 6) by the link bar 65. Then the pivot plate 57 is caused by the bars 66 and bar 65 to move from its Figure 6 retracted position into the extended or upright position shown in Figure 7. The "pre-position" of the chock 16 may be disposed with respect to the detent fixture 76, as said fixture appears either in solid lines at 76 or in broken lines at 76a (Figures 7 and 8), or anywhere in such vicinity. Continued leftward movement of the bed plate 55 causes the rightward end wall of the groove 64 to bear against the rightward end of the detent bar 63 thereby effecting a disengagement of the detent pin 75 from the detent recess 74. The interengagement of the pin 75 and recess 74 insures prompt extension of the pivot plate 57 which is accomplished by the time the end of the detent bar 63 engages the plate 55.

The movement of the chock 16 from its retracted position (Figure 6) into its extended, "pre-position" (Figure 7) is occurring as the aircraft is moving along the broken lines "A," "B" and "C" in Figure 12. After the shuttle hook 17 has moved into said battery position at the rearward end of the shuttle slot 19, but before the landing gear reaches the broken line position of Figure 12, the right chock 16 is moved into its final position (Figure 8). The nose wheel 58 of the aircraft is now taxied into engagement with said right chock 16. The switch 93a in the circuitry for the left chock 15 corresponding to the switch 93 is thereupon closed either manually or by the mechanism 61 (Figure 6) responsive to the striking of the right chock by the nose wheel. This actuates the mechanism controlling the left chock and causes the left chock 15 to be brought from its retracted position (Figure 7) into said final position shown in Figure 8. In their final positions, the chocks 15 and 16 may in some cases simply align, but not grip, the nose wheel 58 along the slot 19. Such alignment may be accomplished by slowly taxiing the aircraft forwardly between the chocks 15 and 16 as they are finally positioned.

As soon as said chocks 15 and 16 are in the Figure 8 position, the bridle 21 (Figure 11), which is secured to the fuselage of the aircraft 22 is hooked around the shuttle 17 thereby preventing backward movement of said aircraft with respect to said shuttle. Alternatively, the chocks may grip the nose wheel sufficiently tight to prevent such rearward movement and the bridle affixed later. At this moment, the main landing gear or wheels 56 are in the broken line position as shown in Figure 12. The motor 37 of the actuating device 36 (Figure 2) is then energized, thereby rotating the belt 13, through the gear box 38 and chain belt 41. Belt 14 is rotated in a similar manner. With a tricycle type gear, the belts are rotated so that the upper courses 32 and 33 respectively of each belt is moved rearwardly. This tends to caster the main wheels 56 of the aircraft around from their broken line positions to their solid line positions (Figure 12) or the broken line positions shown in Figure 1. Such castering may be accomplished with the pivot point located at either the shuttle hook or at the nose wheel. The belts 13 and 14 are stopped as soon as the aircraft is aligned and such alignment will normally require less than five seconds.

A hold-back cable or hook 52 secured to the fuselage of the aircraft (Figure 11) may be fastened to a hold-back cleat 51 in a conventional manner (Figures 1 and 12) so that the aircraft engine can be run up and given a final check prior to take-off. During this period of aircraft pre-flight check, the chocks 15 and 16 are returned to their retracted position, as appearing in Figure 6, thereby removing them as an obstruction to the forward movement of the aircraft and the shuttle 17 when the launching device is actuated at the termination of the pre-launching cycle.

As soon as the launching mechanism is actuated, thereby immediately moving the aircraft away from the aligning apparatus, a new cycle of operation may be initiated wherein the next aircraft is moved along the tracks "A," "B" and "C" (Figure 12) toward the aligning apparatus while the rightward chock is simultaneously moved into "pre-position" pending the return of the shuttle 17 into battery position after which the right chock is moved into final position. Engagement thereof by the nose wheel of the next aircraft to be aligned, will again initiate the sequence of first moving the left chock into final position and, after the aircraft is secured to the shuttle, then castering the main gear into alignment.

Where an aircraft having conventional landing gear is to be aligned by the aligning apparatus 10, the nose wheel chocks 15 and 16 are not used. The circuit selected by the switch 103 does not energize the motor 84 or its counterpart for the chock 15, and both chocks remain in the retracted position of Figure 6 throughout the positioning and launching cycle. The taxiing up, and preliminary positioning of, an aircraft having conventional wheels can be completely accomplished without obstructing the retracting movement of the shuttle 17, as shown by the broken line paths of such wheels in Figure 13. The hold-back cable or hook 52 of the aircraft is fastened to the cleat 51 when the aircraft landing wheels arrive at the broken line positions of Figure 13. The aircraft main wheels 56 will, at the same time, be disposed upon the translating belts 13 and 14, as in the case of the tricycle landing gear. However, the pivot point of the aircraft having conventional gear will be where the hook 52 engages the cable 51, rather than the shuttle 17, and the upper courses of the translating belts 13 and 14 are moved in a forward direction rather than rearwardly as when aligning an aircraft having tricycle gear. Actuation of the belts 13 and 14 will caster the aircraft wheels from the broken line positions into the solid line positions of Figure 13. The bridle 21 is then secured to the shuttle 17 in the same manner as it would be for an aircraft having tricycle gear. The cycle of operation from here on is identical with that of the tricycle aircraft, namely position, warm-up and launch.

While throughout the foregoing it has been assumed that the aircraft, or other object being positioned, is wheel supported, and such is the major present use contemplated for the device, it will be apparent in view of the foregoing that other types of devices, as skid supported aircraft, may in some circumstances also be handled with the method and device of the invention.

Although we have described for illustrative purposes a particular, preferred apparatus whereby our invention may be carried out, it will be understood that variations or modifications thereof which lie within the scope of the invention are fully contemplated unless specifically stated to the contrary in the appended claims.

We claim:

1. A chock device for positioning an article upon a surface comprising: a flat bed plate parallel with, and reciprocably movable along, said surface; a pivot plate hinged upon said bed plate about an axis perpendicular to the direction of movement of said bed plate for movement between a position parallel with said surface and a position perpendicular thereto; a detent bar slidably disposed between said bed plate and said surface for a limited amount of movement with respect to said bed plate in said direction; linkage connecting said detent bar to said pivot plate; and means on said surface for releasably holding said detent bar while said bed plate is moved said limited amount to pivot said pivot plate from one of its said positions to the other.

2. In apparatus for positioning an aircraft on a horizontal surface with respect to a straight line along said surface, said aircraft having a nose wheel, the combination comprising: a bed plate parallel with, and supported upon, said surface for movement toward and away from said line; a pivot plate hinged upon said bed plate for movement about an axis parallel with said line between a position parallel with said surface and a position perpendicular thereto; an elongated opening through said bed plate, near said axis and extending away therefrom; a groove in said bed plate adjacent to said surface, parallel with said opening and communicating with the extended end thereof; a detent bar slidably disposed within said groove and extending into said opening; a link bar extending through said opening and pivotally connected between said pivot plate and the adjacent end of said detent bar; and means on said surface for releasably holding said detent bar while said bed plate is moved a sufficient distance along said surface to pivot said pivot plate from one of its said positions to the other.

3. Apparatus for positioning an aircraft on a horizontal surface with respect to a point in a straight line along said surface, said aircraft having laterally spaced wheeled supports and a fuselage, the combination comprising: means connected to, and selectively opposing movement of, said aircraft in one direction substantially parallel with said line; a pair of laterally spaced, flat, endless conveyors having upper courses parallel with, and on opposite sides of, said line, each of said conveyors being engageable with one of said wheeled supports; laterally rigid means on said surface beneath said aircraft and between said conveyors for engaging said aircraft to anchor a point near an end of said fuselage in laterally non-movable position with respect to and over a point on said line.

4. The combination of claim 3 including a hitch on said fuselage near the trailing end thereof, said laterally rigid means and said means opposing movement of the aircraft including a hold down cleat on said surface between said conveyors and positioned along said line, said cleat being engagable with the hitch on the aircraft fuselage.

5. Apparatus for positioning an aircraft on a horizontal surface with respect to a launching device movable along a straight line on said surface, said aircraft having a fuselage, main wheels and a nose wheel, the combination comprising: a shuttle hook in said launching device movable along said line, means on said fuselage for connecting said shuttle hook thereto; a cleat on said surface spaced rearwardly from said shuttle hook along said line, means on said fuselage for engaging said cleat, said second-named means being spaced rearwardly on the fuselage from the first-named means; a pair of laterally spaced, flat, endless conveyors having upper courses parallel with, and located on, either side of said line, each of said conveyors engaging one of said main wheels and being movable in a direction parallel to said line; a pair of chocks on said surface located forwardly of the ends of said conveyors, said chocks being engagable with either side of said nose wheel to hold same in laterally nonmoving position.

6. The combination of claim 5 including means for moving said chocks from a retracted position flush with said surface and an extended position wherein said chocks extend substantially at right angles to said surface.

7. Apparatus for positioning a vehicle on a substantially horizontal surface with respect to a straight line along said surface, said vehicle being supported by a pair of depending, transversely spaced, support elements, comprising: a pair of transversely spaced, flat, endless conveyors having upper courses parallel with, and on opposite sides of, said line, each of said conveyors contacting one of said elements; anchor means secured to, and extending upwardly from, said surface and positioned substantially along said line; and means for interengaging said anchor means and said vehicle to anchor a point on said vehicle in position with respect to a point on said line.

8. Apparatus for positioning an aircraft on a horizontal surface with respect to a launching device movable along a straight line on said surface, the combination comprising: a shuttle hook in said launching device, said shuttle hook being connectible to an aircraft and being movable along said line; a hold-down device on said surface, spaced rearwardly from said shuttle hook along said line, said hold-down device being engagable with an aircraft; a pair of laterally spaced, flat, endless conveyors having upper courses located on either side of said line substantially flush with said surface, said conveyors being movable in a direction parallel to said line.

References Cited in the file of this patent

UNITED STATES PATENTS

| | | |
|---|---|---|
| 1,995,974 | Fleming | Mar. 26, 1935 |
| 2,145,685 | Chilton | Jan. 31, 1939 |
| 2,483,078 | Williams | Sept. 27, 1949 |
| 2,523,314 | Maxon | Sept. 26, 1950 |
| 2,672,306 | Doolittle | Mar. 16, 1954 |